(12) United States Patent
Venkatasubramanian et al.

(10) Patent No.: US 9,524,233 B2
(45) Date of Patent: Dec. 20, 2016

(54) SYSTEM AND METHOD FOR EFFICIENT SWAP SPACE ALLOCATION IN A VIRTUALIZED ENVIRONMENT

(71) Applicant: VMware, Inc., Palo Alto, CA (US)

(72) Inventors: Rajesh Venkatasubramanian, San Jose, CA (US); Ishan Banerjee, Santa Clara, CA (US); Kiran Tati, Santa Clara, CA (US); Philip Peter Moltmann, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 495 days.

(21) Appl. No.: 13/785,235

(22) Filed: Mar. 5, 2013

(65) Prior Publication Data
US 2014/0258670 A1 Sep. 11, 2014

(51) Int. Cl.
*G06F 12/02* (2006.01)
*G06F 3/06* (2006.01)
*G06F 12/08* (2016.01)

(52) U.S. Cl.
CPC ............ *G06F 12/023* (2013.01); *G06F 3/064* (2013.01); *G06F 3/0608* (2013.01); *G06F 3/0665* (2013.01); *G06F 3/0683* (2013.01); *G06F 12/08* (2013.01); *G06F 2212/152* (2013.01)

(58) Field of Classification Search
CPC .. G06F 12/0207; G06F 3/0601; G06F 12/023; G06F 3/0608; G06F 9/45558; G06F 12/08; G06F 9/5077; G06F 9/45533; G06F 12/02; G06F 3/0665; G06F 3/0604; G06F 3/0683; G06F 2212/152
USPC .............................................. 711/6, 170–173
See application file for complete search history.

(56) References Cited

U.S. PATENT DOCUMENTS

| 7,624,240 | B1 * | 11/2009 | Colbert et al. ................. 711/159 |
| 8,793,290 | B1 * | 7/2014 | Pruthi et al. .................... 707/821 |
| 8,832,411 | B2 * | 9/2014 | Iyigun ..................... G06F 12/08 711/203 |
| 2013/0159662 | A1 † | 6/2013 | Iyigun |

\* cited by examiner
† cited by third party

*Primary Examiner* — Jasmine Song (57) ABSTRACT

A technique for efficient swap space management creates a swap reservation file using thick provisioning to accommodate a maximum amount of memory reclamation from a set of one or more associated virtual machines (VMs). A VM swap file is created for each VM using thin provisioning. When a new block is needed to accommodate page swaps to a given VM swap file, a block is removed from the swap reservation file and a block is added to the VM swap file, thereby maintaining a net zero difference in overall swap storage. The removed block and the added block may be the same storage block if a block move operation is supported by a file system implementing the swap reservation file and VM swap files. The technique also accommodates swap space management of resource pools.

20 Claims, 10 Drawing Sheets

SYSTEM AND METHOD FOR EFFICIENT SWAP SPACE ALLOCATION IN A VIRTUALIZED ENVIRONMENT

BACKGROUND

Virtualized computing environments provide tremendous efficiency and flexibility for systems operators by enabling computing resources to be deployed and managed as needed to accommodate specific applications and capacity requirements. As virtualization systems mature and achieve broad market acceptance, demand continues for increased consolidation of virtual machines (VMs) on host server systems to enable on-going efforts to reduce operating costs. Over-commitment of resources, such as memory and processing resources, enables a high degree of consolidation. Process migration from a source host server system to a target host server system is a key feature that enables flexibility in managing rapidly growing numbers of VMs within virtualized computing environments. VMware's vMotion® product enables process migration between host server systems.

A host virtualization system, commonly known as a hypervisor, an example of which is VMware's ESX® Server product, executes on a host server system to manage resident VMs and to provide certain services to the resident VMs, such as managing host server system resources for each VM. For example, a VM that executes as a guest on the hypervisor may be configured to present a guest physical memory space to a guest operating system. To the guest operating system, the guest physical memory space may be indistinguishable from a memory space provided by physical machine memory, such as a physical memory subsystem comprising dynamic random access memory (DRAM). However, each guest physical memory space is actually a distinct virtual memory space that is assigned to a corresponding VM and managed by the host virtualization system. At least a portion of a given guest physical memory space may be mapped to and reside within host physical memory (machine memory). Each guest physical memory space is typically backed to a swap file within a file system provided by the host virtualization system. The file system may reside within a mass storage system coupled to the host server system. Because other processes may allocate space on the mass storage system, each swap file is pre-allocated to avoid swap failure. The swap file is conventionally pre-allocated using thick provisioning to accommodate swapping of all unreserved guest physical memory, where the unreserved guest physical memory represents the physical memory allocated to the VM in excess of the physical memory reserved for that VM.

Each guest physical memory space typically resides within a corresponding swap file, with at least a portion of the guest physical memory space mapped to and residing within machine memory. The host server system implements memory over-commitment when configured to execute a set of VMs having a total guest physical memory space that is larger than available machine memory. To manage guest physical memory usage for a given VM, memory entitlement parameters are typically applied to the VM. Memory entitlement parameters include a memory reservation that reserves a minimum machine memory space for the VM, a memory limit that sets a maximum machine memory usage for the VM, and a memory share for setting priority of machine memory usage between VMs. These entitlement parameters may also be applied to a resource pool (RP), e.g., a pool of hardware resources made available by a cluster of host server systems, to control memory entitlements for the resource pool, sibling VMs within the RP, or sibling RPs. Guest physical memory size is a memory entitlement parameter that indicates an amount of guest physical memory space for a VM. Guest physical memory size conventionally determines the size of a corresponding swap file used to back the guest physical memory.

The hypervisor employs a strict admission control policy to ensure that the total of all memory reservations for all executing VMs does not exceed available physical system memory. To enforce this policy, the hypervisor does not over-commit the memory reservation entitlement parameter. The hypervisor also determines and reserves swap space required to back all unreserved guest physical memory for a given VM. If the VM's guest physical memory size or memory reservation entitlement parameters change, the hypervisor re-computes swap space requirements and may expand a given swap space to ensure that each powered-on VM always has adequate backing store space in either machine memory or an associated swap file. In certain settings, the hypervisor may be configured to store each VM guest physical memory space in a different swap file for greater efficiency during process migration and for data isolation between VMs.

Although a swap file or a collection of swap files may be conventionally configured to pre-allocate adequate backing store capacity for the combined VM's guest physical memory space, such conventional techniques require significant storage capacity, leading to storage and process migration inefficiencies. Therefore, what is needed in the art is a more efficient technique for managing swap space in a virtualized environment.

SUMMARY

One or more embodiments disclosed herein provide methods for managing swap file capacity within a computing system having a plurality of virtual machines (VMs), each with guest physical memory backed by machine memory of the computer system and a corresponding thinly-provisioned VM swap file.

A method for swapping out contents of a page of guest physical memory from the machine memory to a thinly-provisioned VM swap file, according to one embodiment, includes the steps of determining that the thinly-provisioned VM swap file needs additional capacity to store the contents of the page, moving a storage block from a thickly-provisioned swap reservation file to the VM swap file, and storing the contents of the page to the moved storage block.

A method for swapping out contents of a page of guest physical memory from the machine memory to a thinly-provisioned VM swap file, according to another embodiment, includes the steps of determining that the thinly-provisioned VM swap file needs additional capacity to store the contents of the page, allocating a storage block to the thinly-provisioned VM swap file from a pool of free storage blocks, storing the contents of the page to the allocated storage block, and deleting a storage block from a thickly-provisioned swap reservation file.

Further embodiments of the present invention include, without limitation, a non-transitory computer-readable storage medium that includes instructions that enable a computer system to implement one or more aspects of the above methods as well as a computer system configured to implement one or more aspects of the above methods.

DETAILED DESCRIPTION

Figure 1:
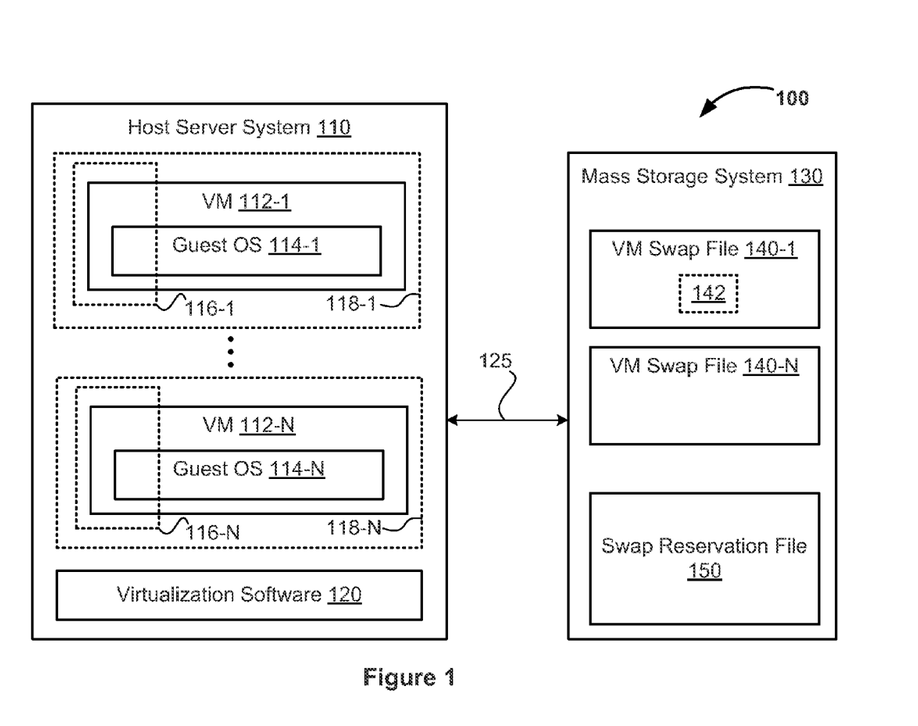
FIG. 1 is a block diagram of a computing system configured to implement one or more embodiments.

FIG. 1 is a block diagram of a computing system 100 configured to implement one or more embodiments. Computing system 100 comprises a host server system 110 and one or more mass storage systems (represented as a mass storage system 130 in FIG. 1). Host server system 110 may be built on an underlying hardware computing platform comprising one or more computer systems, including systems based on different variations of the well-known x86 architecture platforms. Host server system 110 may include one or more virtual machines (VMs) 112 that are each configured to execute a corresponding guest operating system (OS) 114. Virtualization software 120, e.g., ESX®, executes on host server system 110 and manages the VMs 112. Virtualization software 120 may provide certain services to the VMs such as providing a virtual memory runtime environment that presents a specified amount of guest physical memory to each VM, which is configured to appear to be system random access memory. In alternative embodiments, a host operating system configured to include a virtualization system may be implemented instead of virtualization software 120. Exemplary host operating systems include the well-known Linux and BSD Unix.

Mass storage system 130 comprises one or more underlying storage media devices such as magnetic hard disk drives, solid-state drives, or any suitable mass storage media devices that provide persistent storage. Mass storage system 130 may present a networked file system or a block-based unit of storage, such as a storage area network (SAN) logical unit number (LUN), which may then be used to generate a file system by host server system 110.

Interconnect 125 couples host server system 110 to mass storage system 130, enabling communication. Interconnect 125 may implement Ethernet, Fibre Channel (FC), serial attached small computer systems interconnect (SAS), serial attached advanced technology attachment (SATA), or any other technically feasible data networking technology. Interconnect 125 may implement direct attachment, packet switching, packet routing, or any combination thereof, and may comprise one or more physically distinct devices.

A portion of data residing in guest physical memory 118 may be mapped to allocated machine memory 116, which comprises a portion of machine memory residing within host server system 110. A memory reservation establishes a minimum capacity of allocated machine memory 116 for a given VM 112. At least a portion of data residing in guest physical memory 118 in excess of the memory reservation may be mapped to VM swap file 140, residing in mass storage system 130. Swap space isolation is achieved by maintaining a separate VM swap file 140 per VM 112.

When sufficient machine memory capacity is available, all guest data comprising guest physical memory 118 for a given VM 112 may reside entirely within allocated machine memory 116. When total guest physical memory for all executing VMs 112 exceeds total machine memory capacity of host server system 110, then host server system 110 is over-committed for memory and at least a portion of guest physical memory data is stored within one or more VM swap files 140. Guest physical memory 118 associated with each VM 112 is organized as a plurality of pages residing in allocated machine memory 116, a corresponding VM swap file 140, or a combination thereof. A given page 142 may be swapped between allocated machine memory 116 and the corresponding VM swap file. In the embodiments described herein, a swap reservation file 150 is also used to reserve storage for VM swap files 140 associated with a given host server system 110. It should be recognized that page swapping may also occur in situations where host server system 110 is not over-committed for memory, e.g., when the size of a VM's allocated memory space is greater than an upper limit on the memory size that has been pre-defined for that VM.

Swap reservation file 150 is allocated using thick provisioning, which results in storage of a predetermined capacity reserved within mass storage system 130. This capacity may be increased as needed (assuming additional space is available within mass storage system 130) by expanding swap reservation file 150. Each VM swap file 140, on the other hand, is implemented using thin provisioning, such that storage space is allocated as data is written to the VM swap file. It should be recognized that, in a conventional setting, this form of on-demand allocation is not suitable for swap files, because additional on-demand capacity within mass storage system 130 may not be available when needed to write a page to the VM swap file. A failed page swap resulting from such situations may cause an associated VM to catastrophically fail. Embodiments of the present invention ensure available capacity via thick provisioning of swap reservation file 150, which is allocated to accommodate at least a total swap capacity for the operation of all VMs 112 associated with a given host server system.

Two different embodiments are discussed in greater detail below regarding the use of the storage capacity of swap reservation file 150 by the individual swap files of VMs 112. In one embodiment, a host file system accommodates the moving of allocated blocks between swap reservation file 150 and individual thinly-provisioned VM swap files 140. In a second embodiment where moving of a block between files is not accommodated by the host file system, individual thinly-provisioned VM swap files are allocated blocks from a free pool and swap reservation file 150 is shrunk in size by the same amount.

The sizing of swap reservation file 150 is now described using Equations 1-5 shown below. Each VM swap file 140 requires at most a size $S_{VM\_swap}$ defined as a difference between guest physical memory size 212 ($S_{guest\_mem}$) and a memory reservation size ($S_{mem\_res}$) for a corresponding VM 112, as given below in Equation 1.

$$S_{VM\_swap}=S_{guest\_mem}-S_{mem\_res} \qquad (Eq.\ 1)$$

Prior to execution, the VM is allocated a portion of machine memory equal to the memory reservation size, and a corresponding VM swap file is configured using thin provisioning to have a file size defined by Equation 1. In many practical usage scenarios actual swap space required by the VM is a fraction of guest physical memory size 212. When sufficient machine memory is available, actual swap space required by the VM may be zero. During normal operation of the VM, if guest physical memory utilization exceeds a memory reservation size for the VM, then additional machine memory is allocated to the VM if available. If the additional machine memory is not available, pages of guest physical memory are swapped out and stored within the VM swap file to free up the needed space in machine memory.

One property of memory allocation for virtualization software 120 is that total virtualization overhead ($S_{virt\_oh}$) plus kernel overhead ($S_{kernel\_oh}$) plus user overhead ($S_{user\_oh}$) is configured to be less than available total machine memory, or a size of physical random access memory ($S_{pRAM}$) available to virtualization software 120. This property is stated below in Equation 2.

$$(S_{virt\_oh}+S_{kernel\_oh}+S_{user\_oh})<S_{pRAM} \qquad (Eq.\ 2)$$

Figure 2A:
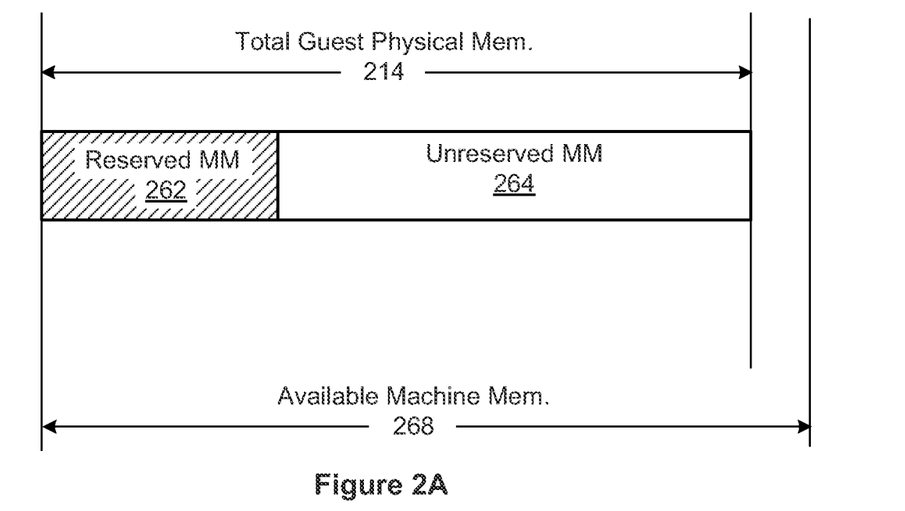
FIG. 2A illustrates a scenario where a swap reservation file is not needed.
Figure 2B:
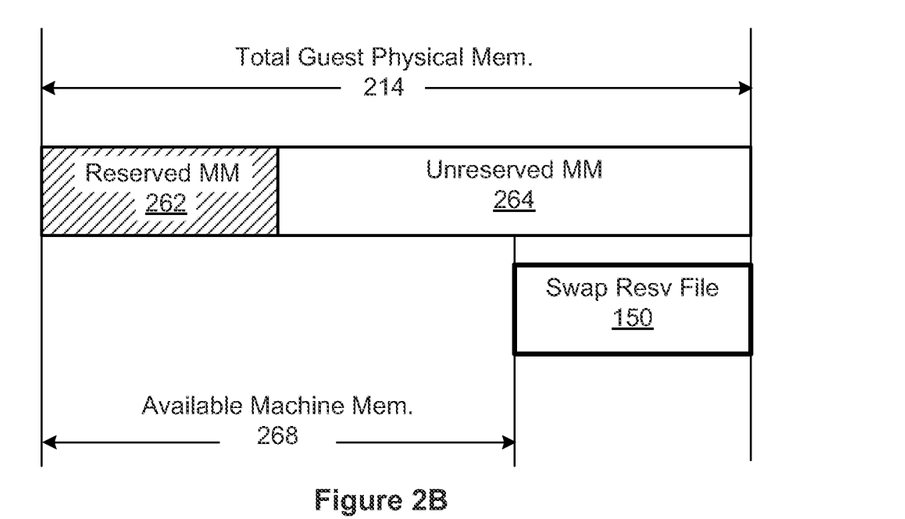
FIG. 2B illustrates a scenario where a swap reservation file is needed.

If the VMs are not over-committed in memory (see FIG. 2A) and none of the VM's have pre-defined memory size limits that are smaller than their actual memory allocation, swap reservation file 150 does not need to be provisioned; otherwise, swap reservation file 150 is provisioned to accommodate all memory requirements beyond available guest physical memory (see FIG. 2B). This sizing policy for swap reservation file 150 is expressed below in Equation 3. Here, swap reservation file 150 is sized according to $S_{swap\_res}$, which is referred to herein as a swap reservation with over-commitment (SROC).

$$S_{swap\_res}=\mathrm{MAX}(S_{total\_gm}+S_{virt\_oh}+S_{kernel\_oh}+S_{user\_oh}-S_{pRAM},0) \qquad (Eq.\ 3)$$

It should be recognized that the total memory reservation for all VMs ($P_{total\_mres}$) is bounded by $S_{pRAM}$ and given below in Equation 4 as a sum of individual VM memory reservations ($S_{mem\_res}$). Summation index i refers to a particular VM.

$$P_{total\_mres}=\Sigma_i S_{mem\_res}(i) \leq S_{pRAM} \qquad (Eq.\ 4)$$

Equation 4 is enforced by virtualization software 120 by guaranteeing the availability of sufficient free machine memory for a memory reservation of $S_{mem\_res}(i)$ as a condition of powering ON a new VM.

In addition, total guest physical memory ($S_{total\_gm}$) from Equation 3 is defined below in Equation 5 as a sum of guest physical memory sizes $S_{guest}(i)$ for corresponding VMs.

$$S_{total\_gm}=\Sigma_i S_{guest}(i) \qquad (Eq.\ 5)$$

FIG. 2A illustrates a scenario where total guest physical memory 214 is less than available machine memory 268. In such a scenario, swap reservation file 150 generally would not be needed. One exception would be if one or more of the VM's have pre-defined memory size limits that are smaller than their actual memory allocation. FIG. 2B illustrates a scenario where swap reservation file 150 is needed. As shown, total guest physical memory 214, which comprises reserved machine memory 262 and unreserved machine memory 264, is larger than available machine memory 268. Swap reservation file 150 in such cases is thickly provisioned with a size equal to the excess of total guest physical memory 214 over available machine memory 268.

Figure 3A:
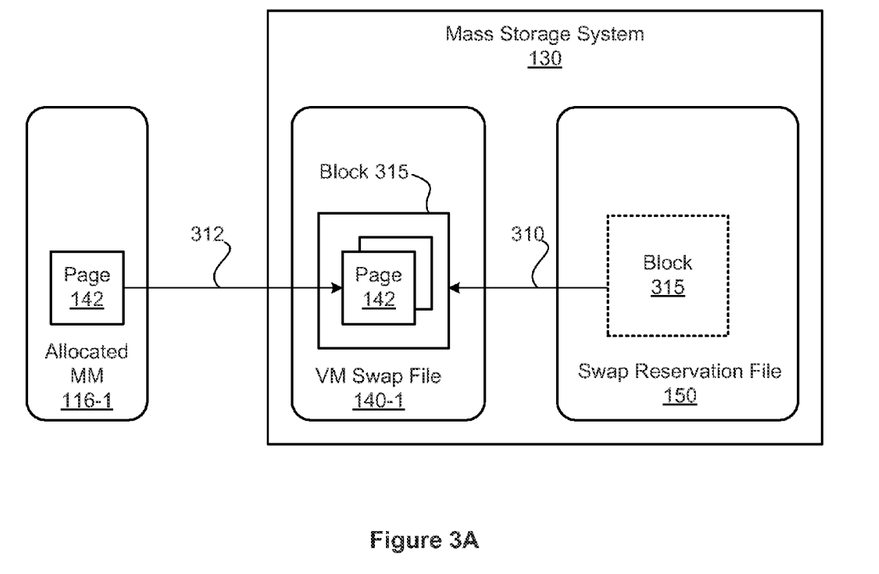
FIG. 3A conceptually illustrates a method of reclaiming a page of allocated machine memory for file systems that support block moves between files.

FIG. 3A conceptually illustrates a method of reclaiming a page of allocated machine memory for file systems that support block moves between files. During normal operation of a given VM 112 of FIG. 1, page 142 of allocated machine memory 116 may be selected to be swapped out by virtualization software 120 to reclaim a page of machine memory. In one embodiment, the file system for VM swap file 140-1 and swap reservation file 150 is structured to store data in units of blocks each comprising one or more pages of data. For example a block may include one megabyte (1 MB) of data, while a page may include four kilobytes (4 KB) of data. In such a configuration, up to two hundred fifty six (256) pages may reside within each block.

As described previously, to guarantee swap capacity for all VMs 112 in cases where total guest physical memory exceeds available machine memory, swap reservation file 150 is configured using thick provisioning. When a VM swap file needs additional space, a block is moved from swap reservation file 150 to the VM swap file to accommodate the additional space needed for saving the contents of one or more pages being reclaimed from allocated machine memory 116. In the example given herein, block 315 is first moved via move operation 310 from swap reservation file 150 to VM swap file 140-1 to provide storage capacity for page 142. After block 315 is added to VM swap file 140-1, write operation 312 may be executed to store the contents of page 142 to a page within block 315. In one embodiment, the block move operation is implemented by modifying the metadata of the swap reservation file and the VM swap file such that a pointer to the moved block is deleted from the metadata of the swap reservation file and added to the metadata of the VM swap file.

Under certain circumstances, a block of storage may be moved back from VM swap file 140-1 to swap reservation file 150. For example, over time, blocks within swap file 140-1 may become fragmented as a result of certain pages being invalidated. In such cases, pages may be compacted from one set of blocks into a smaller set of blocks, thereby freeing certain blocks. The freed blocks may be returned to swap reservation file 150.

It should be recognized that swap reservation file 150 may be allocated to include additional blocks of storage to account for allocation granularity differences between pages and blocks. For example, if each of four total VMs needs a maximum of one page of storage for their corresponding VM swap file, then swap reservation file 150 would be configured with a single block. However, the first VM swap file to receive the one block would starve the other VM swap files. In such a scenario, and in general, an additional block may be allocated per VM within swap reservation file 150 to account for granularity differences between a block and a page.

Figure 3B:
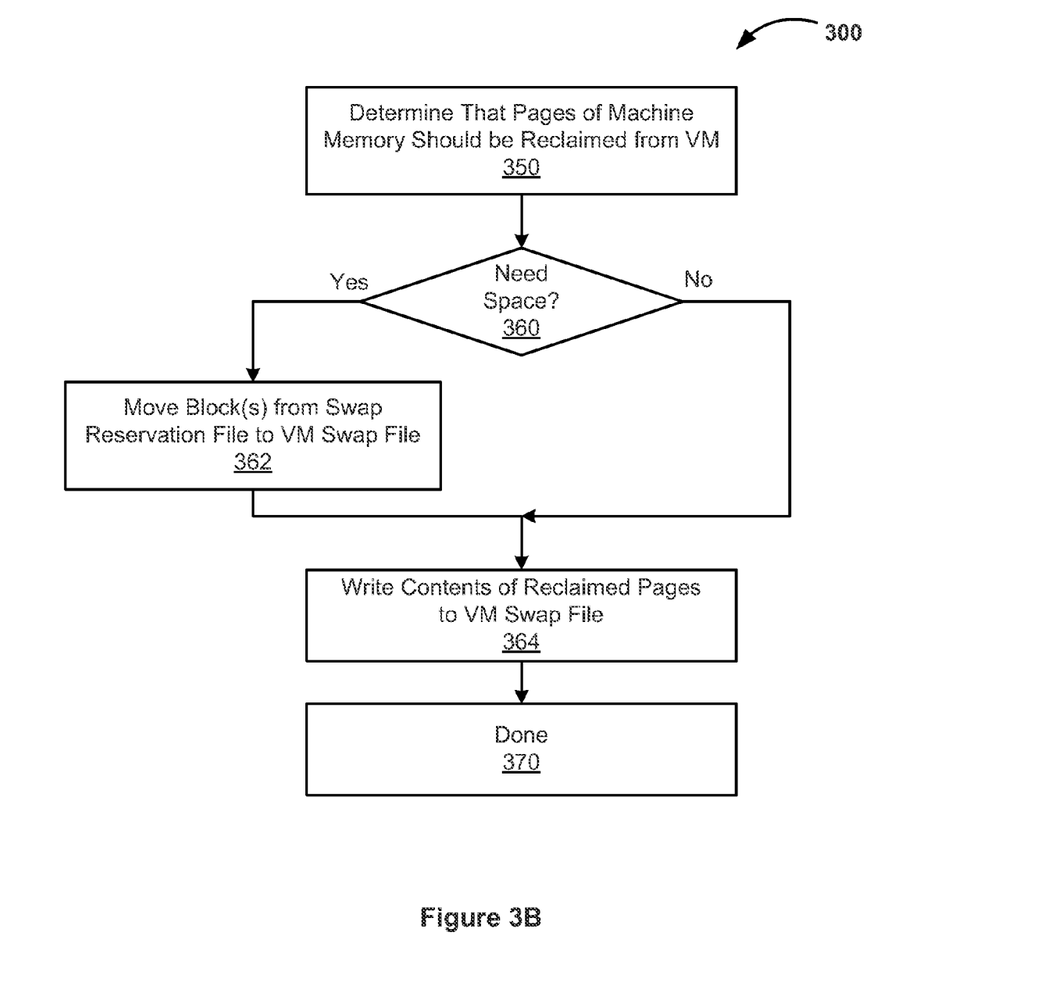
FIG. 3B is a flow diagram of method steps, performed by virtualization software, for reclaiming a page of allocated machine memory for file systems that support block moves between files.

FIG. 3B is a flow diagram of a method 300, performed by virtualization software, for reclaiming a page of allocated machine memory for file systems that support block moves between files. Although the method steps are described in conjunction with the system of FIGS. 1 and 3A, it should be understood that there are other systems in which the method steps may be carried out without departing the scope and spirit of the present invention. Method 300 assumes that a swap reservation file, such as swap reservation file 150, has been created using thick provisioning within a mass storage system with a size determined according to Equation 3 above. Method 300 also assumes that a VM swap file is created using thin provisioning and associated with a given VM for backing guest physical memory used by the VM.

Method 300 begins in step 350, where the virtualization software determines that one or more pages of allocated machine memory associated with a VM, should be reclaimed and the contents therein stored within the VM's swap file. Pages of machine memory may be reclaimed to accomplish a variety of system goals and in response to various system events and operating conditions. For example, pages of machine memory may be reclaimed in preparation of powering-on a new VM, to reduce machine memory utilization, or in preparation for process migration. Furthermore, different reclamation techniques may be implemented, such as ballooning, explicit swapping, and the like. Various reclamation goals and techniques may be implemented without departing the scope and spirit of the present invention.

If, in step 360, the VM swap file needs additional space to accommodate the pages to be reclaimed, then the method proceeds to step 362. In step 362, the virtualization software requests that one or more blocks within the swap reservation file be moved to the VM swap file. In one embodiment, the storage capacity of the moved blocks corresponds to at least the amount of storage required to store the pages of allocated machine memory. It should be recognized that, as a result of the move operation, the metadata of the VM swap file and the metadata of the swap reservation file are updated such that a pointer to the moved block is added to the metadata of the VM swap file and deleted from the metadata of the swap reservation file. In step 364, the virtualization software writes the contents of the pages to be reclaimed to the VM swap file. The method terminates in step 370. Returning to step 360, if the VM swap file does not need additional space, then the method proceeds directly to step 364.

Method 300 requires an underlying file system to support thick provisioning and thin provisioning, as well as a block move operation to move storage blocks between the swap reservation file and one or more VM swap files. VMware's Virtual Machine File System (VMFS) is one example of a commercial file system that supports moving storage blocks between files. Specifically, VMFS includes a set of application programming interfaces (APIs) to enable explicit block move operations between files.

When the swap storage requirements for a VM shrink, one or more blocks may be moved from the VM swap file back to the swap reservation file. Swap storage requirements may shrink for various reasons such as pages being released from use by an application, or when pages are swapped out of the VM swap file and back into allocated machine memory. One challenge in moving a block from the VM swap file to the swap reservation file is that the block generally becomes internally fragmented by finer grain page access to the block. Normal paging activity may result in a given block storing some pages that actually back guest physical memory, some other pages that have been swapped back into allocated machine memory, and some pages that have been released and are no longer valid. It should be recognized that only a block that is backing no pages of guest physical memory may be moved from the VM swap file to the swap reservation file. Normal paging activity may cause a plurality of blocks to become sufficiently fragmented that an equivalent storage space of one or more entire blocks is unnecessary and represents an overall loss of swap space. To avoid a situation where fragmented blocks create an effective loss of overall swap space, the virtualization software executes block compaction either as a continuous process or in response to implementation-dependent triggers. Block compaction comprises copying pages of backed guest physical memory in a source block to a target block for consolidation within the VM swap file. Copied pages may be marked invalid within the source block. Once no valid pages reside within the source block, the source block may be moved back to the swap reservation file. At this point, pages within the source block are no longer available for swapping, however a new block may be moved from the swap reservation file and allocated to the VM swap file if additional pages need to be subsequently saved to the VM swap file.

While certain file systems, such as VMware's VMFS file system, support file block move operations for moving blocks from one file to another file, some file systems may not support this operation. For example, network file system (NFS) does not have support for file block move operations. An alternative embodiment that does not require file block move operations is described below in conjunction with FIGS. 4A and 4B.

Figure 4A:
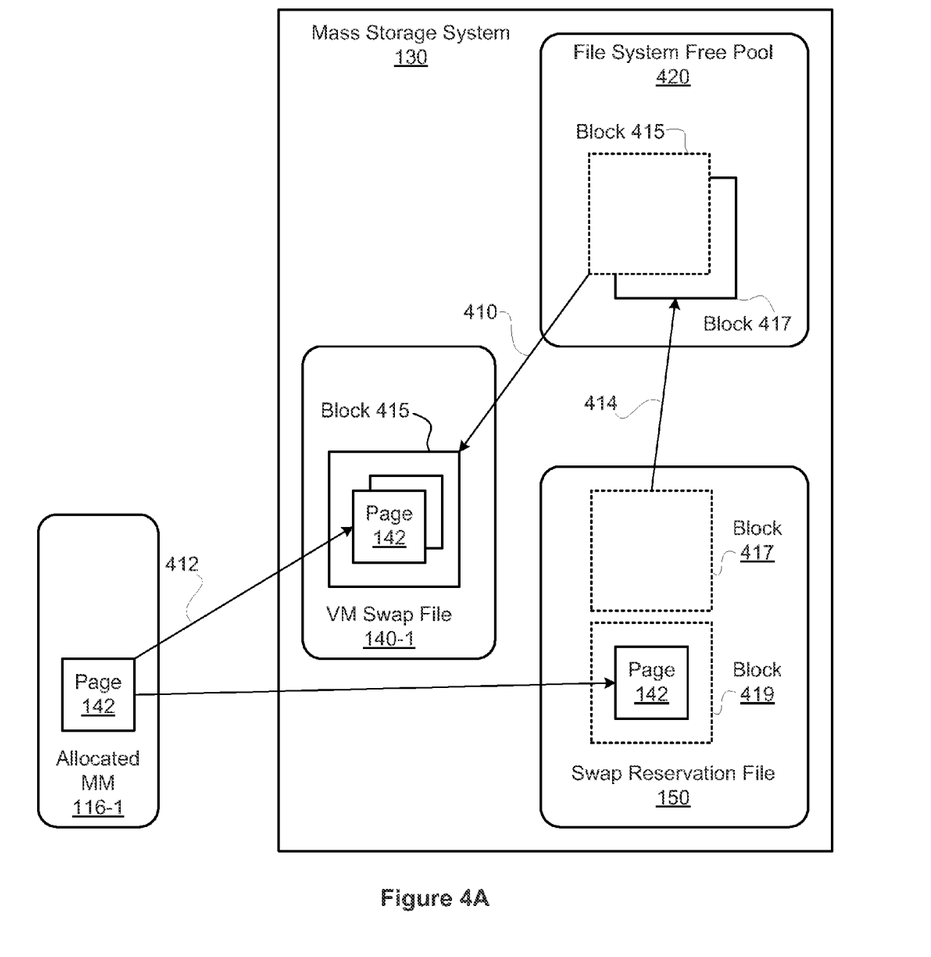
FIG. 4A conceptually illustrates a method of reclaiming a page of allocated machine memory for file systems that do not support block moves between files.

FIG. 4A conceptually illustrates a method of reclaiming a page of allocated machine memory for file systems that do not support block moves between files. During normal operation of a given VM 112 of FIG. 1, page 142 of allocated machine memory 116 may be selected to be swapped out by virtualization software 120 to reclaim a page of machine memory. As described above in FIG. 3A, the file system for VM swap file 140-1 and swap reservation file 150 may be structured to store data in units of blocks each comprising one or more pages of data.

In the example described herein, when a VM swap file needs additional space to save the contents of page 142, block 415 is allocated to the VM swap file from a file system free pool 420, which may be implemented as a bitmap of free blocks of storage. After block 415 is allocated, write operation 412 may be executed to store the contents of page 142 to a page allocated within block 415. If write operation 412 succeeds, a block (e.g., block 417) is returned to file system free pool 420 from swap reservation file 150, as a result of which the size of swap reservation file 150 decreases by one block.

If file system free pool 420 is empty when VM swap file 140-1 needs an additional block, an existing block within swap reservation file 150 is allocated to store page 142. In the example described herein, block 419 is allocated to store page 142, and metadata for page 142 within a corresponding page directory is updated to indicate that page 142 is residing within swap reservation file 150 rather than VM swap file 140-1.

As described previously in FIG. 3A, VM swap file 140-1 may be compacted to free one or more blocks of storage and the size of swap reservation file 150 increased accordingly. In addition, swap reservation file 150 may be allocated to include additional blocks of storage to account for allocation granularity differences between pages and blocks.

Figure 4B:
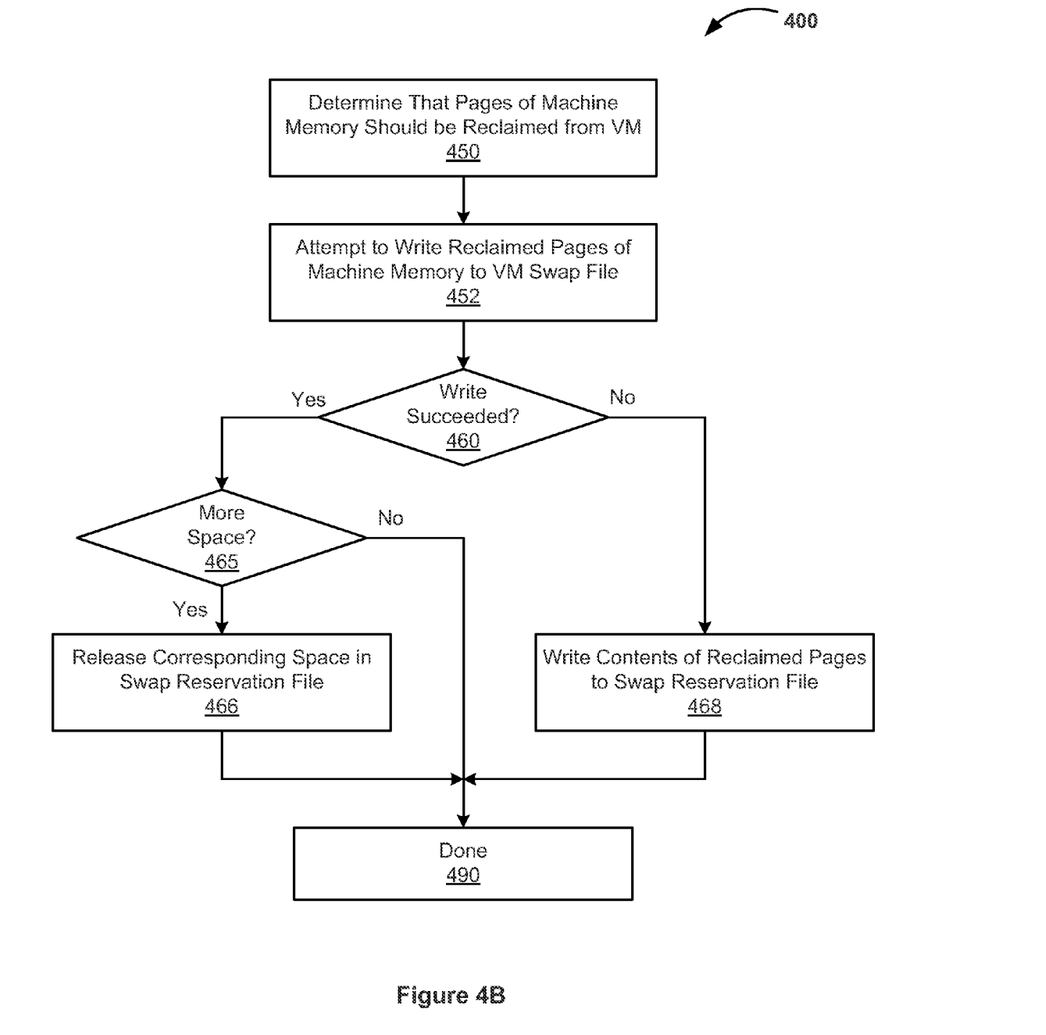
FIG. 4B is a flow diagram of method steps, performed by virtualization software, for reclaiming a page of allocated machine memory for file systems that do not support block moves between files.

FIG. 4B is a flow diagram of a method 400, performed by virtualization software, for reclaiming a page of allocated machine memory for file systems that do not support block moves between files. Although the method steps are described in conjunction with the system of FIGS. 1 and 4A, it should be understood that there are other systems in which the method steps may be carried out without departing the scope and spirit of the present invention. Method 400 assumes that a swap reservation file, such as swap reservation file 150, has been created using thick provisioning within a mass storage system with a size determined according to Equation 3 above. Method 400 also assumes that a VM swap file is created using thin provisioning and associated with a given VM for backing guest physical memory used by the VM.

Method 400 begins in step 450, where the virtualization software determines that one or more pages of allocated machine memory associated with a VM, should be reclaimed and the contents therein stored in the VM's swap file. Pages of machine memory may be reclaimed to accomplish a variety of system goals and in response to various system events and operating conditions. For example, pages of machine memory may be reclaimed in preparation of powering-on a new VM, to reduce machine memory utilization, or in preparation for process migration. Furthermore, different reclamation techniques may be implemented, such as ballooning, explicit swapping, and the like. Various reclamation goals and techniques may be implemented without departing the scope and spirit of the present invention.

In step 452, the virtualization software attempts to write the contents of the reclaimed pages to the VM swap file. It should be recognized that, because the VM swap file was created using thin provisioning within the mass storage system, new blocks would be added to the VM swap file on an as-needed basis from file system free pool 420. There is, however, no guarantee that a write attempt will succeed because the file system free pool may be empty (i.e., mass storage system 130 is full) when the write attempt is actually performed, and there may be no free pages within the VM swap file.

If, in step 460, the write attempt to the VM swap file succeeded, then the method proceeds to step 465, where the virtualization software determines whether or not the VM swap file had to be provisioned additional blocks for the write. If, in step 465, it is determined that more space had to be provisioned for the write, the method proceeds to step 466, where the virtualization software instructs the mass storage system to release a corresponding number of blocks in the swap reservation file. If, in step 465, it is determined more space was not provisioned for the write, the method terminates in step 490.

Returning to step 460, if the write attempt to the VM swap file does not succeed, then the method proceeds to step 468, where the virtualization software writes the contents of reclaimed machine memory pages to an available block in the swap reservation file, and updates the metadata for the reclaimed pages to indicate that the pages are residing within the swap reservation file 150 rather than the VM swap file. Accordingly, when a VM is migrated, the swap state of the pages of the VM's guest physical memory are checked to locate the page in machine memory, an associated VM swap file, or the swap reservation file to ensure all pages of VM's guest physical memory are migrated.

Figure 5A:
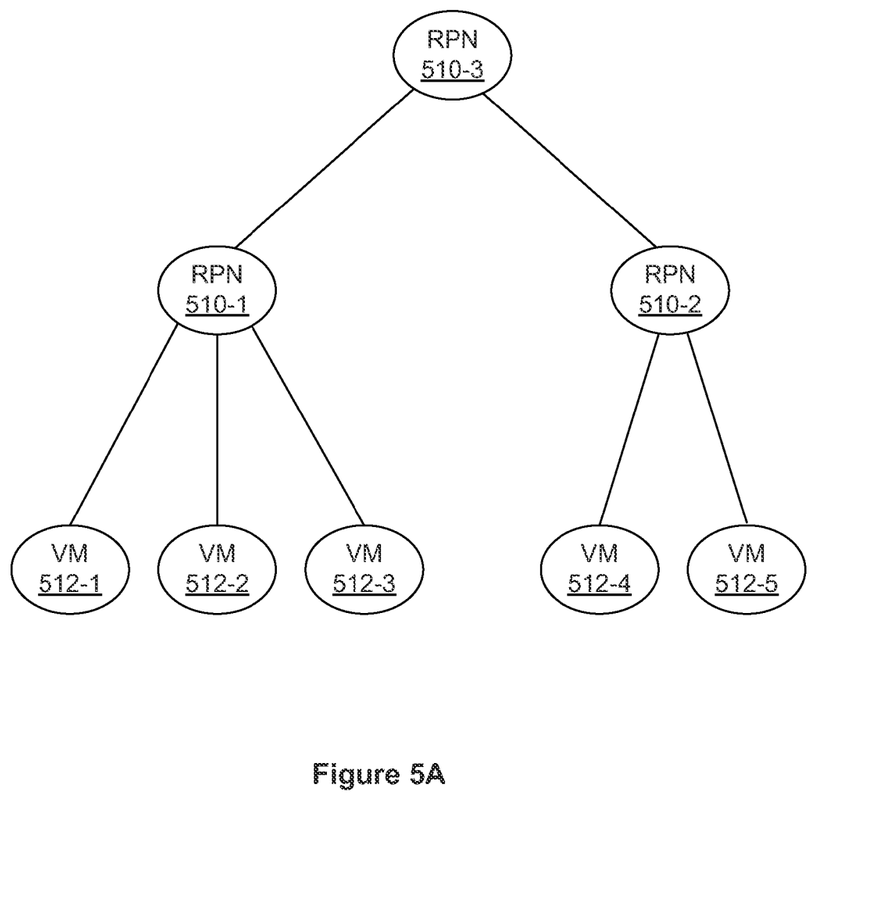
FIG. 5A is a conceptual diagram illustrating a set of resource pools, each comprising virtual machine resources.

FIG. 5A is a conceptual diagram illustrating a set of resource pools, each comprising virtual machine resources. A given resource pool (RP) is represented by a resource pool node (RPN) 510. An RPN may include VMs, represented by RP nodes VM 512. An edge connecting a VM to an RPN indicates the VM is part of a resource pool represented by the RPN. For example VMs 512-1 through 512-3 are members in a resource pool represented by RPN 510-1. Resource pools may include a hierarchy of other resource pools. For example, the resource pool represented by RPN 510-3 includes resource pools represented by RPN 510-1 and RPN 510-2. Each resource pool, and each member of a resource pool, may have certain resource attributes, such as memory entitlement parameters, that define resource application policy for the resource pool. For example, an RP represented by RPN 510-1 may have a memory reservation entitlement that guarantees VMs 512-1 through 512-3 a certain overall minimum allocation of machine memory. Similarly, this same RP may have a memory limit, which specifies how much total machine memory may be allocated to VMs 512-1 through 512-3 when operating in over-commit scenarios. Machine memory may be reclaimed from VMs within an RP in memory over-commit scenarios. A maximum amount of reclaimable memory determines how much storage space is needed within swap reservation file 150 to support a RP.

A bottom-up traversal of the resource pool graph may be used to determine a swap reservation file requirement for root node 510-3 from swap reservation limits of all of its child nodes, where a swap reservation limit for a node represents the maximum amount of reclaimable machine memory for that node. The bottom-up traversal computes swap reservation limits for leaf nodes, then each parent of a leaf node, and so forth until a swap reservation limit may be computed for the root node based on swap reservation limits for all the child nodes of the root node. At each node, a swap reservation limit is computed according to method 500, discussed below in FIG. 5B. The swap reservation limit for the root node represents a maximum amount of reclaimable machine memory for the corresponding RP.

Figure 5B:
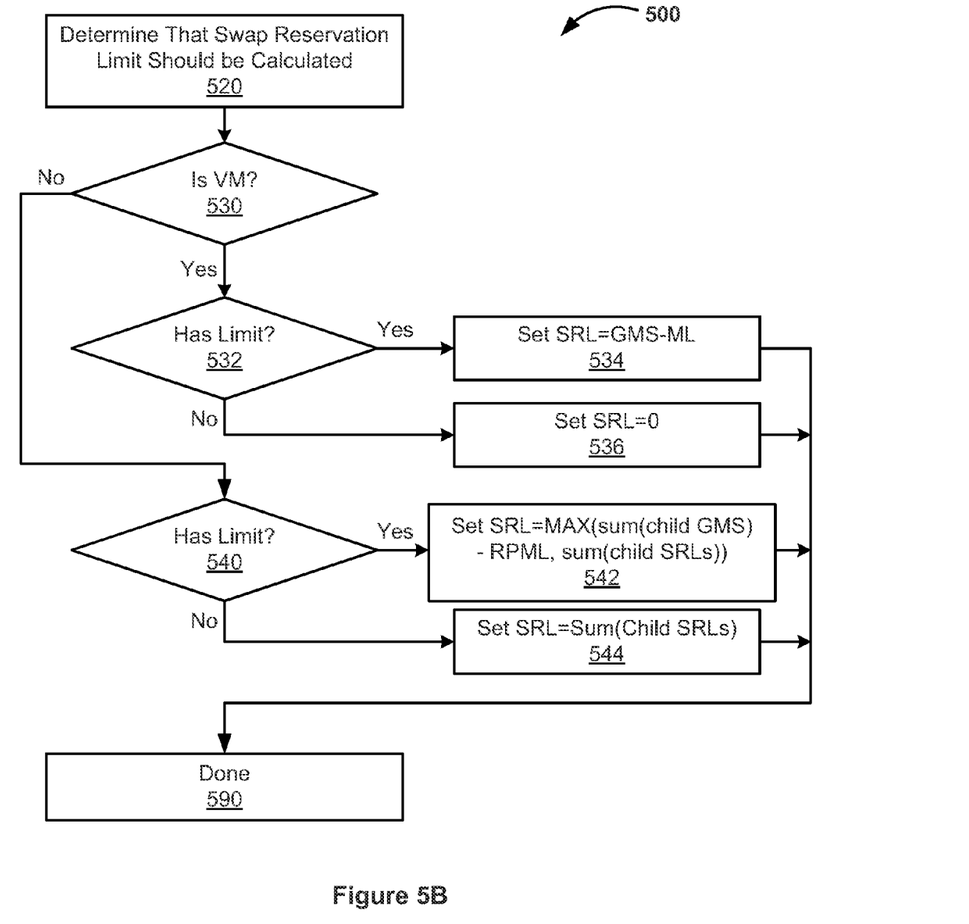
FIG. 5B is a flow diagram of method steps, performed by virtualization software, for determining swap reservation requirements for a resource pool node.

FIG. 5B is a flow diagram of a method 500, performed by virtualization software, for determining swap reservation requirements for a resource pool node. Although the method steps are described in conjunction with the system of FIGS. 1, 3A and 4A, it should be understood that there are other systems in which the method steps may be carried out without departing the scope and spirit of the present invention. Method 500 assumes a swap reservation file, such as swap reservation file 150, can be created using thick provisioning within a mass storage system. Method 500 also assumes that each VM within an RP has a corresponding thinly-provisioned VM swap file that may reside within the mass storage system.

Method 500 begins in step 520, where the virtualization software determines that a swap reservation limit (SRL) should be calculated for the RP. A swap reservation limit (SRL) for a root node of an RP defines the RP's contribution to the size of the swap reservation file. The SRL for the RP may need to be calculated for various reasons. For example, the SRL for an RP may be calculated in response to the virtualization software determining that swap reservation file 150 needs to be resized. This may occur, for example, when new VMs are powered-on or powered-off, or when memory entitlement parameters are changed. If, in step 530, the selected RP node is a VM node, then the method proceeds to step 532.

If, in step 532, the VM node has an enforced memory limit (ML) attribute, then the method proceeds to step 534, where a swap reservation limit (SRL) is set to a guest physical memory size (GMS) for the VM node minus the ML attribute for the VM node. Having calculated the SRL for the RP node, method terminates in step 590.

Returning to step 532, if the VM node does not have an enforced ML, then the method proceeds to step 536, where SRL is set to zero. Having set the SRL for the RP node, method terminates in step 590.

Returning to step 530, if the selected RP node is not a VM node, then the method proceeds to step 540. If, in step 540, the RP node has an enforced resource pool memory limit (RPML) attribute, then the method proceeds to step 542, where the SRL is set to the RPML.

Returning to step 540, if the RP does not have an enforced RPML, then the method proceeds to step 544, where the SRL is set to a sum of child node SRLs. Child node SRL values may be recursively computed using a bottom-up tree traversal of child RP nodes.

Method 500 may be recursively executed on an arbitrary RP node tree or sub-tree to compute a corresponding SRL.

Figure 6:
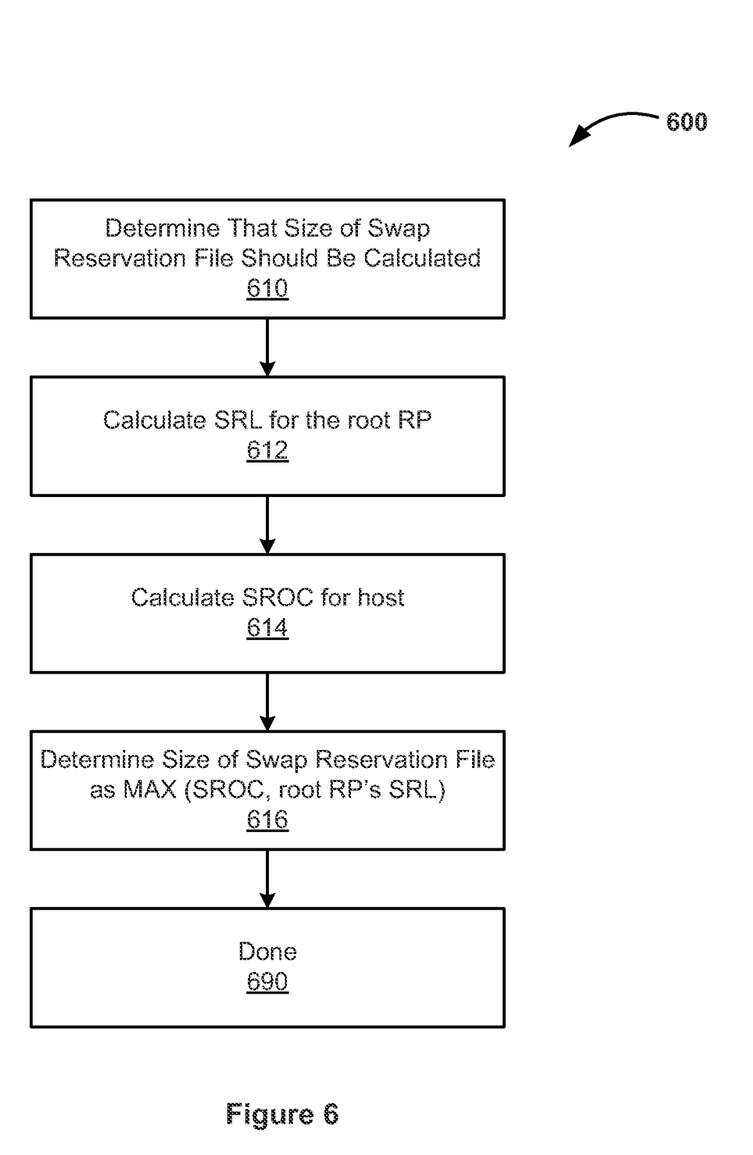
FIG. 6 is a flow diagram of method steps, performed by virtualization software, for sizing a swap reservation file.

FIG. 6 is a flow diagram of a method 600, performed by virtualization software, for sizing a swap reservation file for a host server system. Although the method steps are described in conjunction with the system of FIGS. 1, 3A and 4A, it should be understood that there are other systems in which the method steps may be carried out without departing the scope and spirit of the present invention.

Method 600 begins in step 610, where the virtualization software determines that the size of a swap reservation file, such as swap reservation file 150, should be calculated. This may occur, for example, when a VM is powered-on or powered-off, or when a memory entitlement changes for a VM or RP. In step 612, the virtualization software calculates, using method 500, an SRL for the root RP, which is at the root of every VM node and user-created RP node. In step 614, the virtualization software calculates an SROC for the host server system. The SROC for the host server system is given by Equation 3. In step 616, the virtualization software determines the size of the swap reservation file as the maximum of the root RP's SRL calculated in step 612 and the SROC calculated in step 614. In one embodiment, additional blocks may be allocated to the swap reservation file to account for allocation granularity differences between file block size and guest physical memory page size. Method 600 terminates in step 690.

Figure 7:
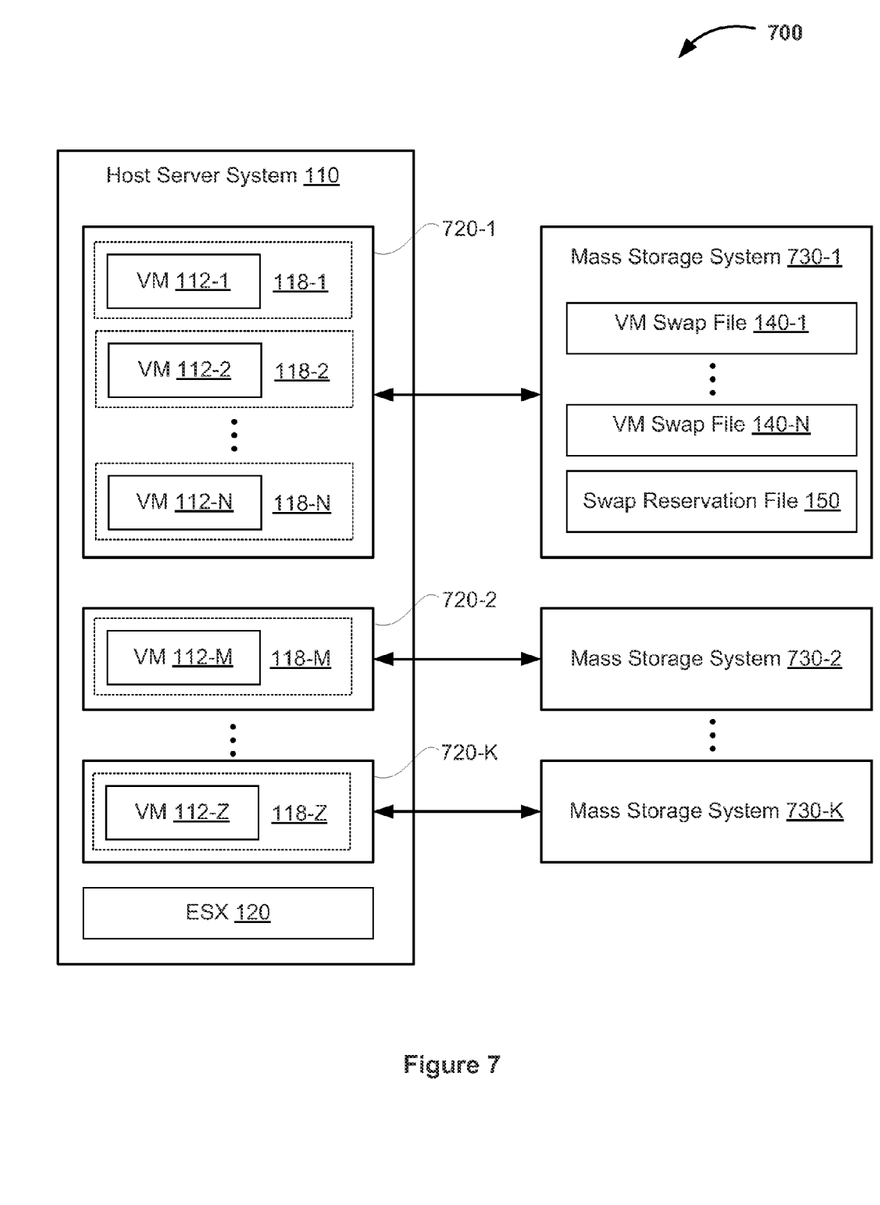
FIG. 7 illustrates a computing system comprising a plurality of data stores, that is configured to implement one or more embodiments.

In certain alternative embodiments, two or more mass storage systems are used as data stores to back guest physical memory for VMs residing on the same host server system 110. In such embodiments, a swap reservation file is created within each of the two or more mass storage systems to act as a block reservation pool for VM swap files residing on the same mass storage system.

FIG. 7 illustrates a computing system 700 comprising a plurality of data stores, that is configured to implement one or more embodiments. Each data store is implemented as a mass storage system 730, each of which is configured to include at least one VM swap file 140 and one swap reservation file 150. A given swap domain 720 includes one or more distinct spaces of guest physical memory 118 that are backed to corresponding VM swap files 140 residing within a single data store. For example, memory spaces for guest physical memory 118-1 through 118-N, associated with respective VMs 112-1 through 112-N, are included in swap domain 720-1. Memory spaces for guest physical memory 118-1 through 118-N within swap domain 720-1 are associated with respective VM swap files 140-1 through 140-N, and swap reservation file 150. Similarly, VM 112-M is included within swap domain 720-2, which is associated with mass storage system 730-2, and VM 112-Z is included within swap domain 720-K, which is associated with mass storage system 730-K.

Techniques for optimizing the size of one swap reservation file 150 in conjunction with plural VM swap files 140 were described above in configurations having one data store for VM swap files 140 and swap reservation file 150. These techniques may be generalized for configurations having multiple data stores, such that there is a swap reservation file per data store. In such a system, for each VM, v, linked to a given data store, the reclaimable memory associated with that VM is computed as the difference between the VM's guest physical memory size, $S_{guest}(v)$ and a machine memory reservation for that VM, $S_{mem\_res}(v)$. The swap reservation size for each data store is then computed as:

$$\text{MIN}[SR, \Sigma(S_{guest}(v) - S_{mem_{res}}(v))] \qquad \text{(Eq. 6),}$$

where SR=swap reservation computed at the root group of the resource tree (computed by considering only those VMs which are linked to the given datastore).

It should be recognized that the swap reservation size computed by Equation 6 may be increased to account for the granularity differences between pages and blocks described above.

In sum, a technique for efficiently managing swap space within a virtualized computing system is disclosed. The technique involves creating a swap reservation file using thick provisioning to accommodate a maximum amount of memory reclamation from a set of one or more associated VMs, each with an associated VM swap file created using thin-provisioning. When a new block is needed to accommodate more page storage within a given VM swap file, a block is removed from the swap reservation file and a block is added to the VM swap file, thereby maintaining a net zero difference in overall swap storage. The removed block and the added block may be the same storage block if a block move operation is supported by a file system implementing the swap reservation file and VM swap files. The technique also accommodates swap space management of resource pools.

One advantage of the embodiments is that swap space is more efficiently allocated and utilized in a virtualization system that supports both efficient process migration and swap space isolation.

The technique for efficient swap space management described above is applied to processes running in virtualized computer systems. The same technique may be applied to processes running in a non-virtualized computer system. In such cases, a thinly-provisioned swap file is provided per process and a thickly-provisioned swap file is provided per data store.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. In a computing system having a plurality of processes running therein, each process having a memory space that is backed by machine memory of the computer system and a corresponding thinly-provisioned swap file, a method for swapping out contents of a page of memory from the machine memory to a thinly-provisioned swap file, said method comprising:
   determining that the thinly-provisioned swap file needs additional capacity to store the contents of the page;
   moving a storage block from a thickly-provisioned swap reservation file to the thinly-provisioned swap file; and
   storing the contents of the page to the moved storage block.

2. The method of claim 1, wherein the computing system is coupled to a mass storage system, and a file system for the thinly-provisioned swap files and the thickly-provisioned swap reservation file is associated with the mass storage system.

3. The method of claim 2, wherein the thickly-provisioned swap reservation file is sized according to a difference between a total machine memory capacity that can be allocated to the processes and a total size of the memory space of the processes.

4. The method of claim 1, wherein the computing system is coupled to first and second mass storage systems, and a first file system for one or more of the thinly-provisioned swap files is associated with the first mass storage system and a second file system for one or more of the thinly-provisioned swap files is associated with the second mass storage system.

5. The method of claim 4, wherein a thickly-provisioned swap reservation file is provided in each of the first and second file systems, and the size of each swap reservation file is computed as a minimum of first and second values, the first value equal to a difference between a total size of the memory space of the processes and a total machine memory capacity that can be allocated to the processes, and the second value equal to a sum of reclaimable memory values for all the processes linked to the corresponding file system, where a reclaimable memory for a process is equal to a total size of the memory space of the process minus a machine memory reservation value associated with the process.

6. The method of claim 1, wherein a size of the page is smaller than a size of the storage block.

7. The method of claim 1, wherein a plurality of processes is organized into hierarchically-arranged resource pools, each having a memory limit parameter, and the thickly-provisioned swap reservation file is sized according to first and second values, the first value equal to a difference between a total machine memory capacity that can be allocated to the processes and a total size of the memory space of the processes, and a second value equal to a swap reservation required by a root node of the resource pools.

8. A non-transitory computer-readable medium comprising instructions for causing a computer system having a plurality of virtual machines (VMs) running therein, each with guest physical memory backed by machine memory of the computer system and a corresponding thinly-provisioned VM swap file, to carry out a method including the steps of:
   determining that the thinly-provisioned VM swap file needs additional capacity to store the contents of the page;
   moving a storage block from a thickly-provisioned swap reservation file to the thinly-provisioned VM swap file; and
   storing the contents of the page to the moved storage block.

9. The non-transitory computer-readable medium of claim 8, wherein the thickly-provisioned swap reservation file is sized according to a difference between a total machine memory capacity that can be allocated to the VMs and a total size of the guest physical memory of the VMs.

10. The non-transitory computer-readable medium of claim 8, wherein the plurality of VMs is organized into hierarchically-arranged resource pools, each having a memory limit parameter, and the thickly-provisioned swap reservation file is sized according to first and second values, the first value equal to a difference between a total machine memory capacity that can be allocated to the VMs and a total size of the guest physical memory of the VMs, and a second value equal to a swap reservation required by a root node of the resource pools.

11. In a computing system having a plurality of processes running therein, each having a memory space backed by machine memory of the computer system and a corresponding thinly-provisioned swap file, a method for swapping out contents of a page of memory from the machine memory to a thinly-provisioned swap file, said method comprising:
 determining that the thinly-provisioned swap file needs additional capacity to store the contents of the page;
 allocating a storage block of a thickly-provisioned swap reservation file to the thinly-provisioned swap file;
 storing the contents of the page to the allocated storage block; and
 modifying a metadata of the thickly-provisioned swap reservation file to delete a pointer to the storage block.

12. The method of claim 11, wherein the computing system is coupled to a mass storage system, and a file system for the thinly-provisioned swap files and the thickly-provisioned swap reservation file is associated with the mass storage system.

13. The method of claim 12, wherein the thickly-provisioned swap reservation file is sized according to a difference between a total machine memory capacity that can be allocated to the processes and a total size of the memory space of the processes.

14. The method of claim 11, wherein the computing system is coupled to first and second mass storage systems, and a first file system for one or more of the thinly-provisioned swap files is associated with the first mass storage system and a second file system for one or more of the thinly-provisioned swap files is associated with the second mass storage system.

15. The method of claim 14, wherein a thickly-provisioned swap reservation file is provided in each of the first and second file systems, and the size of each swap reservation file is computed as a minimum of first and second values, the first value equal to a difference between a total size of the memory space of the processes and a total machine memory capacity that can be allocated to the processes, and the second value equal to a sum of reclaimable memory values for all the processes linked to the corresponding file system, where a reclaimable memory for a process is equal to a total size of the memory space of the process minus a machine memory reservation value associated with the process.

16. The method of claim 11, wherein a size of the page is smaller than a size of the storage block.

17. The method of claim 11, wherein a plurality of processes is organized into hierarchically-arranged resource pools, each having a memory limit parameter, and the thickly-provisioned swap reservation file is sized according to first and second values, the first value equal to a difference between a total machine memory capacity that can be allocated to the processes and a total size of the memory space of the processes, and a second value equal to a swap reservation required by a root node of the resource pools.

18. A non-transitory computer-readable medium comprising instructions for causing a computer system having a plurality of virtual machines (VMs) running therein, each with guest physical memory backed by machine memory of the computer system and a corresponding thinly-provisioned VM swap file, to carry out a method including the steps of:
 determining that the thinly-provisioned VM swap file needs additional capacity to store the contents of the page;
 allocating a storage block of a thickly-provisioned swap reservation file to the thinly-provisioned VM swap file;
 storing the contents of the page to the allocated storage block; and
 modifying a metadata of the thickly-provisioned swap reservation file to delete a pointer to the storage block.

19. The non-transitory computer-readable medium of claim 18, wherein the thickly-provisioned swap reservation file is sized according to a difference between a total machine memory capacity that can be allocated to the VMs and a total size of the guest physical memory of the VMs.

20. The non-transitory computer-readable medium of claim 18, wherein the plurality of VMs is organized into hierarchically-arranged resource pools, each having a memory limit parameter, and the thickly-provisioned swap reservation file is sized according to first and second values, the first value equal to a difference between a total machine memory capacity that can be allocated to the VMs and a total size of the guest physical memory of the VMs, and a second value equal to a swap reservation required by a root node of the resource pools.

* * * * *